US008345590B2

(12) United States Patent
Amagai et al.

(10) Patent No.: US 8,345,590 B2
(45) Date of Patent: Jan. 1, 2013

(54) WIRELESS COMMUNICATION SYSTEM AND WIRELESS COMMUNICATION METHOD FOR SWITCHING WIRELESS CHANNELS

(75) Inventors: Hitoshi Amagai, Fussa (JP); Takehiro Aibara, Hamura (JP); Kimiyasu Mizuno, Akishima (JP); Naotaka Uehara, Higashimurayama (JP); Masato Nunokawa, Fussa (JP); Sumito Shinohara, Akiruno (JP); Takayuki Kogane, Akishima (JP); Tetsuya Handa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 199 days.

(21) Appl. No.: 12/774,122

(22) Filed: May 5, 2010

(65) Prior Publication Data
US 2010/0296434 A1 Nov. 25, 2010

(30) Foreign Application Priority Data

May 25, 2009 (JP) ................................. 2009-125135

(51) Int. Cl.
*H04B 7/14* (2006.01)
(52) U.S. Cl. ........................................ 370/315; 370/329
(58) Field of Classification Search .................. 370/315, 370/350, 242, 243, 329
See application file for complete search history.

(56) References Cited

U.S. PATENT DOCUMENTS

| 7,352,728 | B2 * | 4/2008 | Soomro ......................... 370/338 |
| 7,486,616 | B2 | 2/2009 | Kitchin |
| 8,228,790 | B2 | 7/2012 | Kitchin |
| 2003/0012217 | A1 * | 1/2003 | Andersson et al. ........... 370/437 |
| 2003/0016732 | A1 * | 1/2003 | Miklos et al. .................. 375/132 |
| 2004/0146022 | A1 * | 7/2004 | Lewis et al. .................... 370/331 |
| 2007/0121550 | A1 | 5/2007 | Wada |
| 2008/0123680 | A1 * | 5/2008 | Ko et al. ......................... 370/433 |
| 2008/0144498 | A1 * | 6/2008 | Chung et al. .................. 370/231 |
| 2009/0252064 | A1 * | 10/2009 | Rangarajan et al. .......... 370/256 |
| 2009/0328214 | A1 * | 12/2009 | Dawson .......................... 726/23 |

(Continued)

FOREIGN PATENT DOCUMENTS

CN        1890927 A        1/2007

(Continued)

OTHER PUBLICATIONS

Japanese Office Action dated Jun. 14, 2011 (and English translation thereof) in counterpart Japanese Application No. 2009-125135.

(Continued)

*Primary Examiner* — Brian D Nguyen
(74) *Attorney, Agent, or Firm* — Holtz, Holtz, Goodman & Chick, PC

(57) ABSTRACT

In a wireless communication system including a plurality of wireless terminal apparatuses and a relaying apparatus, the relaying apparatus performs a channel search to select a wireless channel in a good communication situation when the relaying apparatus transmits a beacon signal at a constant period, and transmits switching destination information to be used to switch the wireless channel to the selected one in a state of being stored in the beacon signal. When the communication situation of the wireless channel has deteriorated, the relaying apparatus switches the wireless channel being used by the communication section to the selected one based on the switching destination information. When the communication situation of a wireless channel of the wireless terminal apparatus has deteriorated, the wireless terminal apparatus switches the wireless channel to the selected one based on the switching destination information.

13 Claims, 8 Drawing Sheets

U.S. PATENT DOCUMENTS

2011/0096679 A1     4/2011    Hayashino et al.

FOREIGN PATENT DOCUMENTS

| | | |
|---|---|---|
| JP | 7-067169 A | 3/1995 |
| JP | 2005-006285 A | 1/2005 |
| JP | 2006-094394 A | 4/2006 |
| JP | 2007-019968 A | 1/2007 |
| JP | 2007-150540 A | 6/2007 |
| JP | 2007-158592 A | 6/2007 |
| JP | 2008-148254 A | 6/2008 |
| WO | 2010/007738 A1 | 1/2010 |

OTHER PUBLICATIONS

Japanese Office Action dated Mar. 29, 2011 (and English translation thereof) in counterpart Japanese Application No. 2009-125135.

Chinese Office Action dated Aug. 27, 2012 (and English translation thereof) in counterpart Chinese Application No. 201010188272.0.

* cited by examiner

WIRELESS COMMUNICATION SYSTEM AND WIRELESS COMMUNICATION METHOD FOR SWITCHING WIRELESS CHANNELS

CROSS-REFERENCE TO RELATED APPLICATIONS

This application is based upon and claims the benefit of priority from the prior Japanese Patent Application No. 2009-125135, filed on May 25, 2009, the entire content of which is incorporated herein by reference.

BACKGROUND OF THE INVENTION

1. Field of the Invention

The present invention relates to a wireless communication system and a wireless communication method for switching wireless channels on the basis of the switching destination information of a wireless channel.

2. Description of the Related Art

In recent years, a wireless communication system for performing the transmission and reception of a large quantity of data of a moving image, a still image, a sound, and the like between a relaying apparatus and a wireless terminal apparatus by the use of a wireless local area network (LAN) has been becoming widely used. However, because a large quantity of data is transmitted and received by wireless in such a wireless communication system, it is known that the throughput of the system lowers owing to various interference factors and the turbulence and intermittence of an image and a sound are brought out.

Accordingly, wireless communication systems are required to select wireless channels through which no communication signals interfere with each other among a plurality of wireless channels and to use the selected wireless channels in order to avoid interference. Because it is difficult for a user to perform the selection of a wireless channel according to the ambient environment, there is the technique of making a relaying apparatus judge the communication situation of each of the wireless channels to perform the switching of a wireless channel.

Japanese Patent Application Laid-Open Publication No. 2006-94394 discloses the wireless communication apparatus that transmits a switching instruction of a wireless channel to the other wireless communication apparatus preferentially than other data signals at the time of detecting the deterioration of the communication situation of the wireless channel through which wireless communication is performed. However, if a relaying apparatus changes the wireless channel when the communication situation has abruptly deteriorated or when the communication situation only in the neighborhood on the side of the wireless terminal apparatus has deteriorated, then the wireless terminal apparatus cannot obtain the information of the changed wireless channel by this technique, and it becomes impossible for the wireless terminal apparatus to perform the communication with the relaying apparatus. Accordingly, the wireless terminal apparatus must perform the scanning of all the channels to find out the changed wireless channel.

Moreover, Japanese Patent Application Laid-Open Publication No. 2008-148254 discloses the technique of obtaining the residual quantity of empty slots in an operating channel, storing the information or the like indicating a time until the change of the channel (number of super frames) and the channel after the change into a beacon signal when the obtained residual quantity of the empty slots is equal to or less than the residual quantity of the channel changing slot and when there is an empty channel, transmitting the beacon signal, and changing the operating channel to the empty channel. However, the information or the like indicating the time until the change of the channel and the channel after the change is stored in the beacon signal to be transmitted, after the determination of the change of the channel by this technique. Consequently, when a communication situation has abruptly deteriorated, the wireless terminal apparatus cannot receive the beacon signal, and the technique has the problem of the impossibility of the rapid and stable execution of the change of a wireless channel.

BRIEF SUMMARY OF THE INVENTION

The present invention is provided to achieve the stabilization of communication quality by realizing switching of a wireless channel rapidly and stably when a communication situation has abruptly deteriorated.

To achieve at least one of the aforementioned objects or other objects, a wireless communication system reflecting one aspect of the present invention, comprises:
a plurality of wireless terminal apparatuses; and
a relaying apparatus for performing wireless communication with the plurality of wireless terminal apparatuses, wherein
the relaying apparatus includes:
a first storage section for storing switching destination information of a first wireless channel being any one of a plurality of wireless channels;
a first communication section for performing the wireless communication by transmitting a beacon signal to the plurality of wireless terminal apparatuses by using a second wireless channel being any one of the plurality of wireless channels; and
a first control section for (i) storing, in the beacon signal and in the first storage section, the switching destination information to be used to switch the second wireless channel to the first wireless channel when the first communication section transmits the beacon signal, and transmitting the beacon signal storing the switching destination information with the first communication section, and for (ii) switching the second wireless channel used by the first communication section to the first wireless channel based on the switching destination information stored in the first storage section when a communication situation of the second wireless channel used by the first communication section has deteriorated; and
the wireless terminal apparatus includes:
a second storage section for storing the switching destination information of the first wireless channel;
a second communication section for performing the wireless communication by receiving the beacon signal transmitted from the relaying apparatus by using the second channel being anyone of the plurality of wireless channels; and
a second control section for (i) storing the switching destination information stored in the beacon signal into the second storage section at a time of receiving the beacon signal with the second communication section, and for (ii) switching the second wireless channel being used by the second communication section to the first wireless channel based on the switching destination information stored in the second storage section when a communication situation of the second wireless channel used by the second communication section has deteriorated.

To achieve at least one of the aforementioned objects or other objects, in a wireless communication method, reflecting one aspect of the present invention, between a plurality of wireless terminal apparatuses and a relaying apparatus, the relaying apparatus including a first communication section for performing wireless communication by transmitting a beacon signal to the plurality of wireless terminal apparatuses by using a first wireless channel being any one of the plurality of wireless channels, the wireless terminal apparatus including a second communication section for performing the wireless communication by receiving the beacon signal, transmitted from the relaying apparatus, by using the first wireless channel being any one of a plurality of wireless channels, the method comprises the steps of:

storing switching destination information to be used to switch the first wireless channel to a second wireless channel being another of the plurality of wireless channels, in the beacon signal together with in a first storage section, equipped in the relaying apparatus, when the communication section transmits the beacon signal;

transmitting the beacon signal storing the switching destination information with the first communication section;

switching the first wireless channel used by the first communication section to the second wireless channel based on the switching destination information stored in the first storage section when a communication situation of the wireless channel used by the first communication section has deteriorated;

storing the switching destination information stored in the beacon signal into a second storage section equipped in each of the wireless terminal apparatus when the second communication section of the wireless terminal apparatus receives the beacon signal; and switching the first wireless channel used by the second communication section to the second wireless channel based on the switching destination information stored in the second storage section when the communication situation of the first wireless channel used by the second communication apparatus has deteriorated.

According to the present invention, it is possible to achieve the stabilization of communication quality by realizing switching of a wireless channel rapidly and stably when a communication situation has abruptly deteriorated.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention, and wherein.

DETAILED DESCRIPTION OF THE INVENTION

In the following, the preferred embodiments of the present invention will be described in detail with reference to the attached drawings. Incidentally, this invention is not limited to these embodiments. Moreover, the embodiments of this invention indicate the best modes of the invention, and the terminology of this invention is not limited to those in the embodiments.

First Embodiment

First, the configuration of a first embodiment is described.

Figure 1:
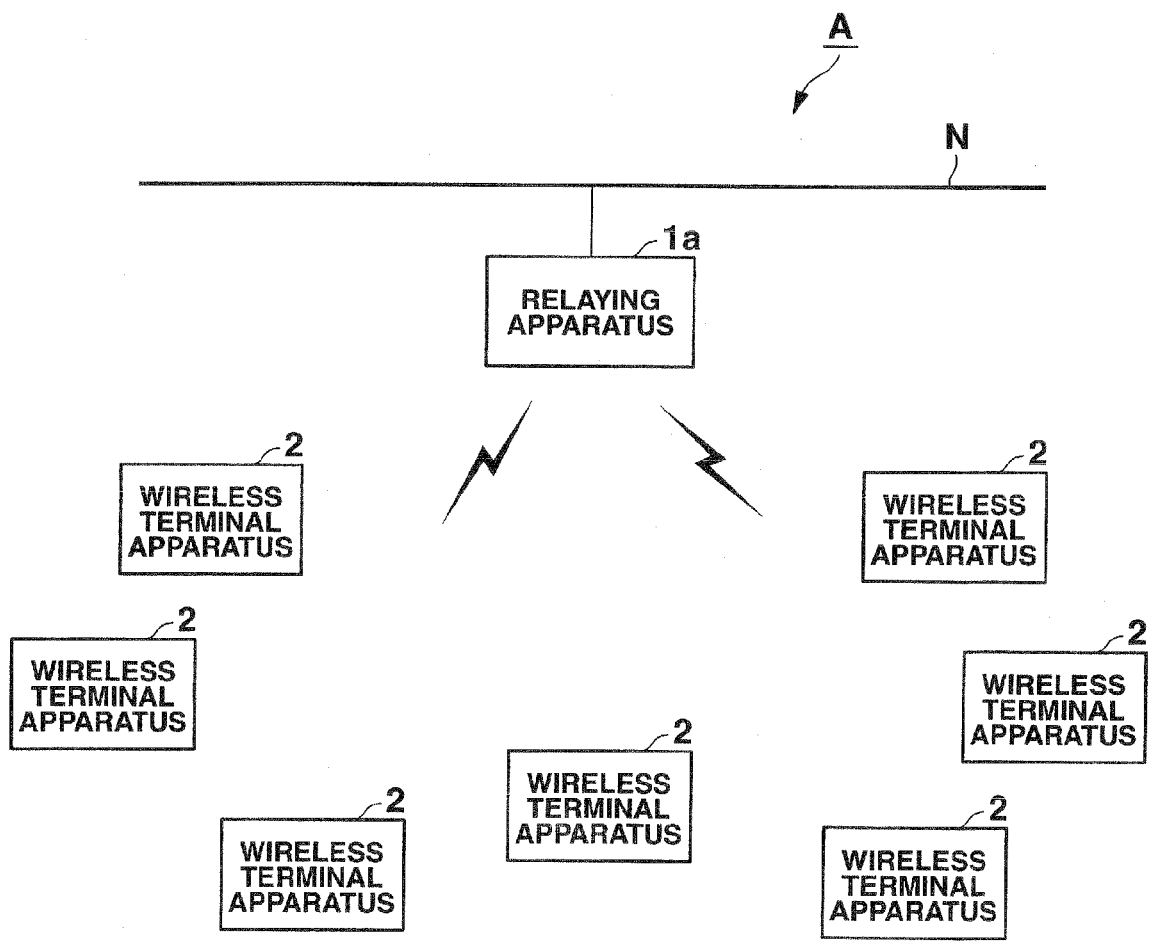
FIG. 1 shows a schematic configuration diagram of a wireless communication system.

FIG. 1 shows a schematic configuration diagram of a wireless communication system A in the present first embodiment.

As shown in FIG. 1, the wireless communication system A includes a relaying apparatus 1a, connected to another relaying apparatus or an external apparatus through a communication network N, and a plurality of wireless terminal apparatuses 2, connected to the relaying apparatus 1a by wireless.

The wireless communication system A in the present first embodiment is supposed to conform to IEEE 802. 15. 4 standard. In this case, the relaying apparatus 1a and the wireless terminal apparatus 2 correspond to a coordinator and end devices, respectively.

Figure 2:
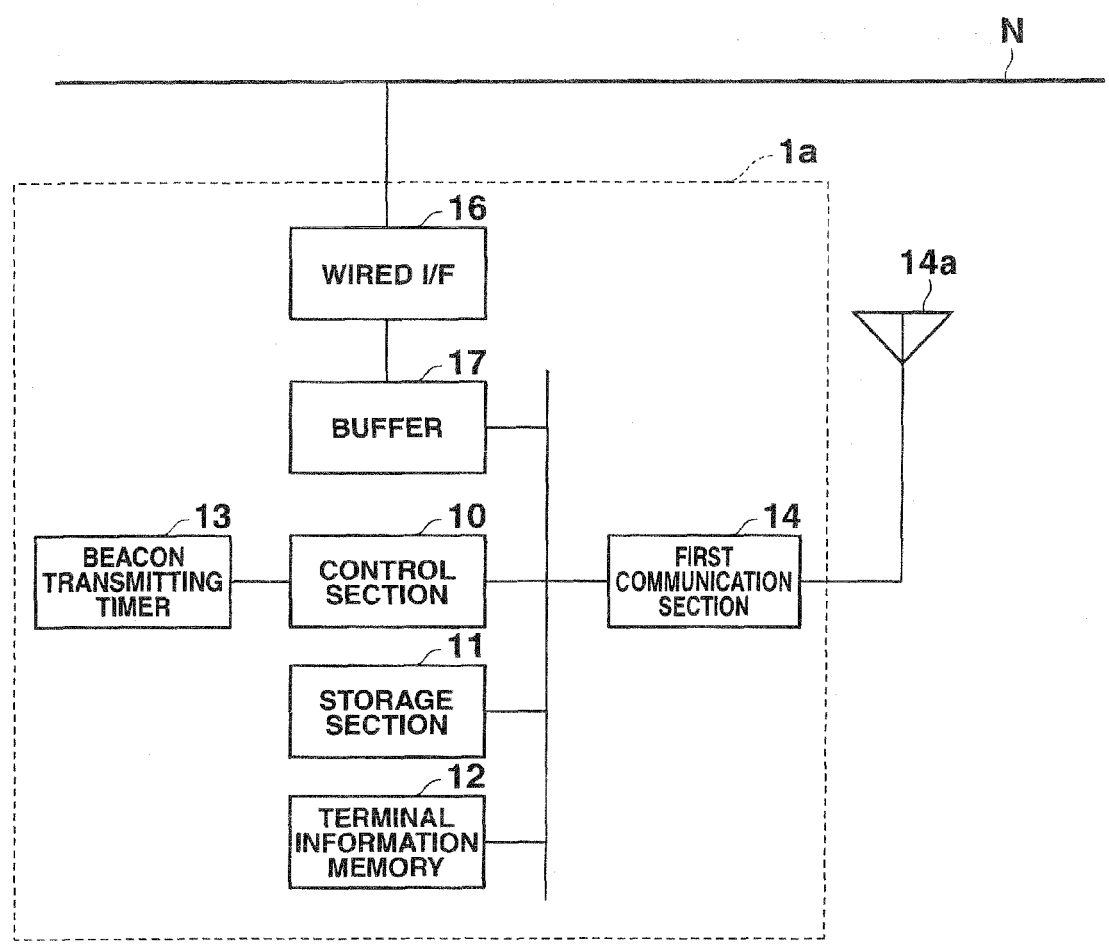
FIG. 2 shows a schematic configuration diagram of a relaying apparatus in the first embodiment.

FIG. 2 shows the schematic configuration diagram of the relaying apparatus 1a in the present first embodiment.

As shown in FIG. 2, the relaying apparatus 1a includes a control section 10, a storage section 11, a terminal information memory 12, a beacon transmitting timer 13, a first communication section 14, a wired interface (I/F) 16, a buffer 17, and the like. Each section is electrically connected to one another.

The control section 10 includes a central processing unit (CPU), a read only memory (ROM), a random access memory (RAM), and the like. The control section 10 reads out a program, a table, and data that are designated among various programs, various tables, data, and the like that are stored in the storage section 11 and the terminal information memory 12 to develop the read-out program and the like into the RAM or the work area of the storage section 11. The control section 10 executes various kinds of processing in cooperation with the program to store the processing results into the RAM, or a predetermined region of the storage section 11 or the terminal information memory 12. Furthermore, the control section 10 instructs each section of the relaying apparatus 1a to collectively control the whole operation of the relaying apparatus 1a.

The control section 10 executes beacon transmitting processing. In the beacon transmitting processing, a beacon signal is generated, and the generated beacon signal is transmitted at a constant period by the first communication section 14 by the use of any one of a plurality of wireless channels.

The wireless channel to be used is, for example, any one of all the 16 wireless channels of 11 ch. to 26 ch., each channel being one of the parts of a 2.4 GHz band divided into 16 ones in IEEE 802. 15. 4.

In the beacon transmitting processing of the present first embodiment, the following processing is executed.

First, when the beacon signal is transmitted at a constant period by the first communication section 14, any one of the plurality of wireless channels is selected. The selected wireless channel, is the one being in the best communication situation or a relatively better communication situation among the communication situations of the plurality of wireless channels detected by the first communication section 14.

Then, the switching destination information for switching the wireless channel to the selected one (switching destination channel) is stored in the storage section 11 and also in the beacon signal, and the beacon signal storing the switching destination information is transmitted by the first communication section 14.

Moreover, if the communication situation of the wireless channel used by the first communication section 14 has deteriorated, the deteriorated wireless channel is switched to another wireless channel based on the switching destination information stored in the storage section 11 at the time of transmitting a beacon signal through the wireless channel to be used by the first communication section 14.

The beacon signal is packet data to be transmitted from the relaying apparatus 1*a* at a constant period for synchronizing the wireless terminal apparatus 2 connected to the wireless communication system A with the relaying apparatus 1*a*.

Figure 3:
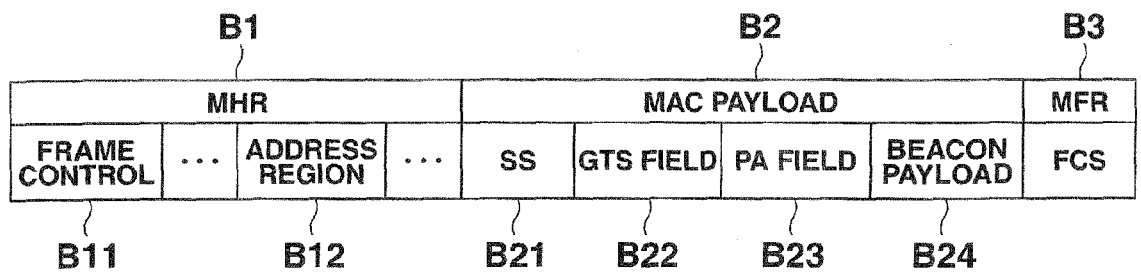
FIG. 3 shows an example of a beacon frame.

FIG. 3 shows an example of a beacon frame in the present first embodiment.

As shown in FIG. 3, the beacon signal includes a media access control (MAC) header region (MHR) B1, a MAC payload region B2, and a MAC footer region (MFR) B3, and is based on the IEEE 802. 15. 4 standard.

The MHR region B1 includes a frame control B11, an address region B12, and the like. The MAC payload region B2 includes a superframe specification (SS) B21, a guaranteed time slot (GTS) field B22, a pending address (PA) field B23, a beacon payload B24, and the like.

The SS B21 is a detailed information field of a superframe, and defines a beacon transmitting interval for performing the time management at the time of receiving a beacon and the communication system of the beacon. The GTS field B22 includes the information of the communication systems (for example, GTS) guaranteed by the wireless terminal apparatus 2. The PA field B23 includes terminal identifying information (node addresses) for identifying the wireless terminal apparatus 2 transmitting data when the wireless terminal apparatus 2 have the data to be transmitted. The beacon payload B24 includes a payload region of about 50 bytes. The beacon payload B24 stores switching destination information therein.

The switching destination information includes the channel number of a switching destination channel, the identification (ID) code indicating the channel number of the switching destination channel, and the like.

The storage section 11 is composed of a magnetic and optical recording medium or a nonvolatile memory, which is made of a semiconductor or the like and can be electrically erased and rewritten. The storage section 11 is fixedly provided in the relaying apparatus 1*a* or mounted therein in a freely attachable and detachable state. Moreover, the storage section 11 previously stores a beacon transmitting processing program and various programs that will be executed by the control section 10, and various tables and data that will be used by these programs, and stores switching destination information.

The switching destination information to be stored in the storage section 11 is rewritten every transmission of a beacon signal.

The terminal information memory 12 is composed of a memory that can electrically be erased and rewritten. The terminal information memory 12 stores the information of the node addresses and the like of the wireless terminal apparatus 2 existing within the region in which the relaying apparatus 1*a* itself can perform communication.

The beacon transmitting timer 13 is a timer timing the transmission interval of a beacon, and outputs a beacon transmission timing signal indicating that a timed time reaches the transmission interval to the control section 10.

The first communication section 14 includes a modulation circuit, a demodulation circuit, a radio frequency (RF) circuit, an antenna 14*a*, and the like, and functions as a communication section performing wireless communication with the plurality of wireless terminal apparatus 2 by the use of any one of the plurality of wireless channels.

The first communication section 14 performs the adjustment of the transmission power of a packet, and performs the coding of the data to be transmitted according to an instruction from the control section 10 to constitute a packet. The first communication section 14 performs the modulation of the configured packet, and performs the transmission of the packet to the wireless terminal apparatus 2 through the antenna 14*a*. Moreover, the first communication section 14 performs the adjustment of the reception sensitivity of a packet, and performs the demodulation of the packet received through the antenna 14*a*. The first communication section 14 outputs the data obtained by the analysis of the demodulated packet to the control section 10.

Moreover, the first communication section 14 scans the electric field strength of each of the plurality of wireless channels (for example, 11-26 channels) and outputs the results obtained by the scanning to the storage section 11.

The wired I/F 16 performs the communication control for performing communication with another relaying apparatus 1*a* or an external apparatus connected to the present relaying apparatus 1*a* by a predetermined communication system through the communication network N.

The buffer 17 temporarily stores the data received through the wired I/F 16.

Figure 4:
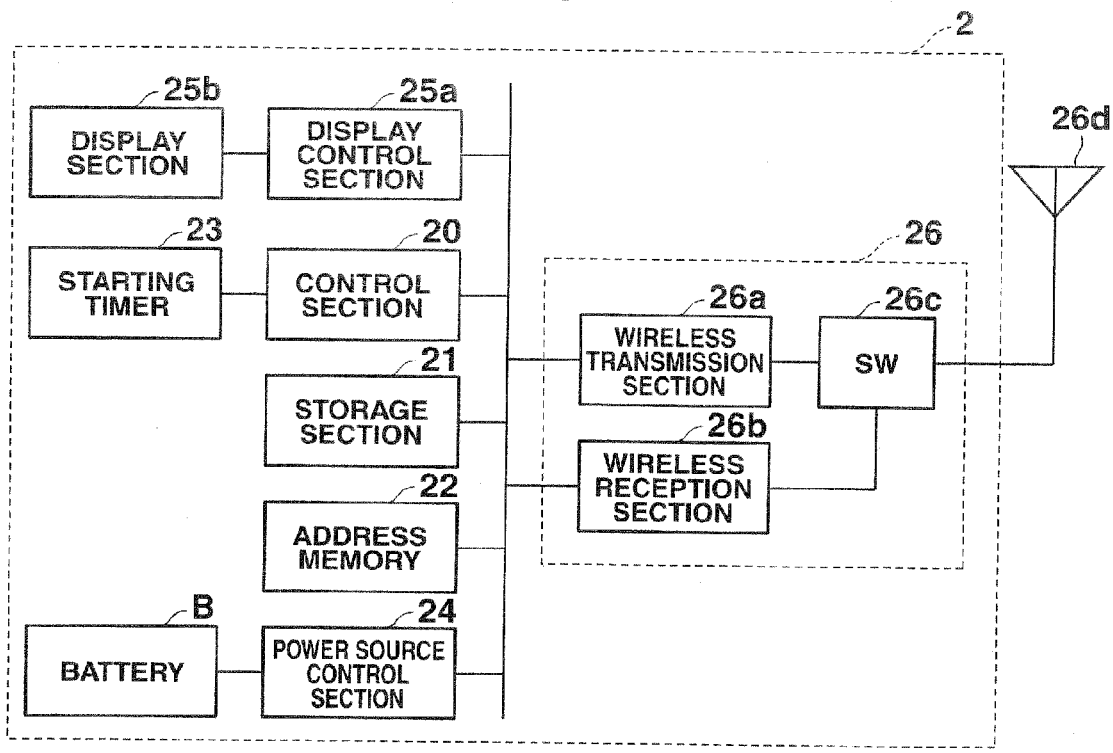
FIG. 4 shows a schematic configuration diagram of a wireless terminal apparatus.

FIG. 4 shows the schematic configuration diagram of each of the wireless terminal apparatus 2.

As shown in FIG. 4, the wireless terminal apparatus 2 includes a control section 20, a storage section 21, an address memory 22, a starting timer 23, a power source control section 24, a display control section 25*a*, a display section 25*b*, a terminal communication section 26, and the like. Each section is electrically connected to one another. Moreover, the wireless terminal apparatus 2 includes a battery B, and electric power is supplied to each section from the battery B according to a control signal from the power source control section 24.

The control section 20 includes a CPU, a ROM, a RAM, and the like, and reads out a designated program, table, and data of the various programs, various tables, and data stored in the storage section 21. The control section 20 develops the read-out program, table, and data into the RAM or the work area in the storage section 21, and executes various processing in cooperation with the program. The control section 20 stores the processing results into the RAM or a predetermined region of the storage section 21, and instructs each section in the wireless terminal apparatus 2 to collectively control the whole operation of the wireless terminal apparatus 2.

The control section 20 functions as a terminal control section executing wireless channel switching processing on the basis of a beacon signal transmitted from the relaying apparatus 1a.

In the wireless channel switching processing, when a beacon signal is received by the terminal communication section 26, the switching destination information stored in the beacon signal is stored in the storage section 21. Moreover, if the communication situation of the wireless channel used in the terminal communication section 26 has deteriorated, the wireless channel used by the terminal communication section 26 is switched to another wireless channel based on the switching destination information stored in the storage section 21.

The storage section 21 is composed of a magnetic and optical recording medium, or a nonvolatile memory made of a semiconductor that can electrically be erased and rewritten, and the storage section 21 is fixedly provided in the wireless terminal apparatus 2 or is mounted thereon in a freely attachable and detachable state. Moreover, the storage section 21 previously stores various programs to be executed by the control section 20, and various tables, data and the like used by these programs. The storage section 21 functions as a terminal storage section storing the switching destination information obtained from a beacon signal. The switching destination information to be stored in the storage section 21 is rewritten every obtainment from a received beacon signal.

The address memory 22 is composed of a nonvolatile memory that can electrically be erased and rewritten. The address memory 22 stores terminal identifying information (node address) for identifying the wireless terminal apparatus 2 itself.

The starting timer 23 is a timer timing the starting timing (starting time) of the terminal communication section 26, and outputs a starting timing signal indicating that it reaches the starting timing to the control section 20. The starting timing is set by the control section 20 on the basis of the transmission period of a beacon signal to be transmitted from the relaying apparatus 1a.

The power source control section 24 controls the power source of the whole wireless terminal apparatus 2 in accordance with an instruction from the control section 20, and supplies electric power from the battery B to each section of the wireless terminal apparatus 2.

The battery B is, for example, a primary battery, such as an alkaline dry cell and a manganese dry cell, and a secondary battery, such as a nickel-cadmium battery, a nickel hydrogen battery, and a lithium ion battery.

The display control section 25a makes the display section 25b display various kinds of information in accordance with a display instruction to be input from the control section 20.

The display section 25b is composed of a liquid crystal display (LCD), an electro luminescence (EL) display, or the like, and displays various screens on the display thereof according to a signal to be input from the display control section 25a.

The terminal communication section 26 includes a wireless transmission section 26a, a wireless reception section 26b, a switching section (SW) 26c, an antenna 26d, and the like. The terminal communication section 26 receives a beacon signal transmitted from the relaying apparatus 1a by the use of any one wireless channel among the plurality of wireless channels to perform wireless communication.

The wireless transmission section 26a includes a modulation circuit, a radio frequency (RF) circuit, and the like. The wireless transmission section 26a performs the adjustment of the transmission power of a packet, and performs the coding of data to be transmitted according to an instruction from the control section 20 to constitute a packet. The wireless transmission section 26a performs the modulation of the configured packet to transmit the packet to the relaying apparatus 1a through the antenna 26d.

The wireless reception section 26b includes a demodulation circuit, an RF circuit, and the like. The wireless reception section 26b performs the adjustment of the reception sensitivity of a packet, and performs the demodulation of a packet received through the antenna 26d. The wireless reception section 26b performs the analysis of the demodulated packet to outputs the obtained data to the control section 20.

Moreover, the wireless reception section 26b scans the electric field strength of each of the plurality of wireless channels (for example, 11-26 channels) through the antenna 26d, and outputs the results obtained by the scanning to the storage section 21.

The SW 26c is provided between the antenna 26d and the wireless transmission section 26a or the wireless reception section 26b, and switches between the transmission of a packet from the wireless transmission section 26a, and the reception of a packet/scanning of electric field strength by the wireless reception section 26b, in accordance with an instruction from the control section 20.

Next, the operation of the present first embodiment is described.

Figure 5:
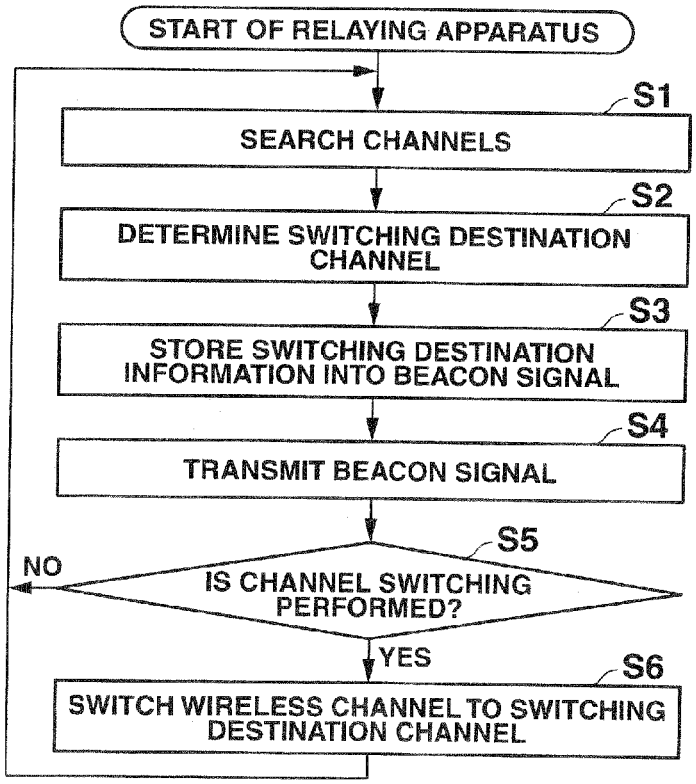
FIG. 5 shows a flow chart of beacon transmitting processing in the first embodiment.

FIG. 5 shows the flowchart of beacon transmitting processing to be executed in the relaying apparatus 1a. Incidentally, the processing shown in FIG. 5 is executed in cooperation with the control section 10 and each section of the relaying apparatus 1a, and is executed while electric power is supplied to the relaying apparatus 1a.

When a beacon transmission timing signal is input into the control section 10 by the beacon transmitting timer 13, the control section 10 executes a channel search with the first communication section 14 to make the first communication section 14 detect the communication situations of all of the wireless channels (Step S1). At Step S1, the control section 10 makes the first communication section 14 scan (measure) the electric field strengths of all of the wireless channels, and makes the first communication section 14 output the scanning results of the electric field strengths of the respective wireless channels obtained by the scanning to the storage section 11.

That is, the results of the electric field strengths of the respective wireless channels obtained at Step S1 are led to be obtained as the communication situations of the respective wireless channels by the processing at Step S1.

The control section 10 selects the wireless channel in the best communication situation on the basis of the communication situations of the respective wireless channels obtained at Step S1, and determines the selected wireless channel as a switching destination channel (Step S2). At Step S2, for example, the wireless channel in the smallest electric field strength among the electric field strengths of the respective wireless channels obtained at Step S1 is selected. Incidentally, the wireless channel in the relatively better communication situation may be selected.

The control section 10 makes the storage section 11 store switching destination information including the information of a switching destination channel and the like, and stores the switching destination information in the beacon payload B24 of a beacon signal (Step S3). Then, the control section 10 makes the first communication section 14 transmit the beacon signal (Step S4).

The control section 10 judges whether to switch the wireless channel used by the first communication section 14 or not on the basis of the communication situation of the wireless channel used by the first communication section 14 (Step S5).

At Step S5, the control section 10 judges the communication situation of the wireless channel used by the first communication section 14 on the basis of the reception situation of an acknowledge (ACK) signal transmitted from each of the wireless terminal apparatus 2 to the beacon signal transmitted at Step S4.

If the wireless channel is not switched (Step S5: NO), control section 10 returns the processing to that at Step S1. As the case of NO at Step S5, for example, if the ACK signals to a beacon signal transmitted at Step S4 can be received from all of the wireless terminal apparatus 2, then the communication situation of the used wireless channel is judged not to have deteriorated, and the switching of the wireless channel is judged not to be performed.

If the wireless channel is switched (Step S5: YES), the control section 10 switches the wireless channel used by the first communication section 14 to the wireless channel (switching destination channel) based on the switching destination information stored in the storage section 11 (Step S6), and returns the processing to that at Step S1.

As the case of YES at Step S5, for example, if no ACK signals can be received from all of the wireless terminal apparatus 2 to a beacon signal transmitted at Step S4, the communication situation of the used wireless channel is judged to have deteriorated, and the wireless channel is judged to be switched.

Incidentally, if a data request signal to a transmitted beacon signal is transmitted from one of the wireless terminal apparatus 2, the relaying apparatus 1a executes data transmitting processing. In this data transmitting processing, an ACK signal and data signal are transmitted to the wireless terminal apparatus 2 that has transmitted the data request signal from the first communication section 14, and the ACK signal to the data signal is received by the first communication section 14.

Figure 6:
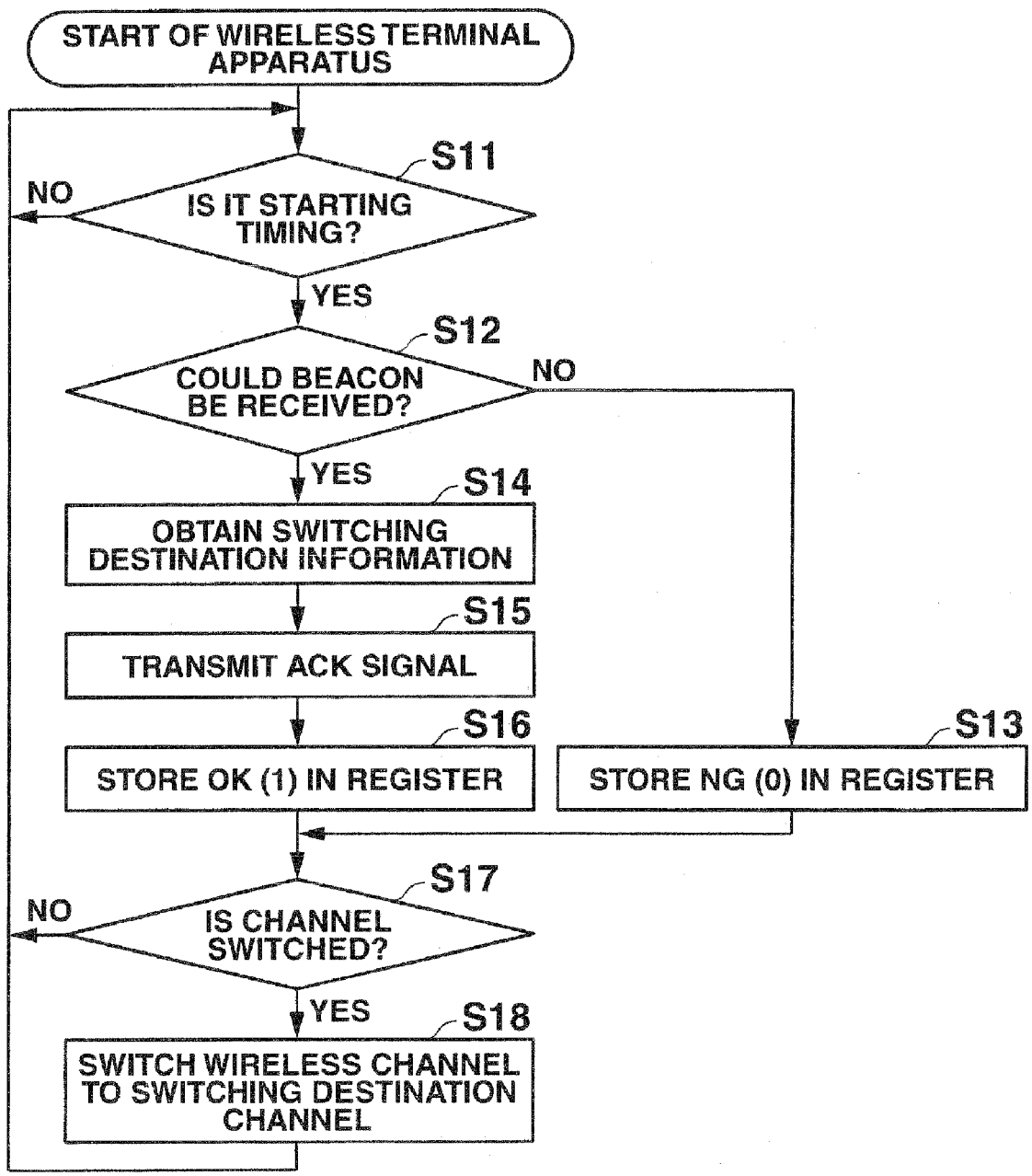
FIG. 6 shows a flow chart of the wireless channel switching processing in the first embodiment.

FIG. 6 shows a flow chart of the wireless channel switching processing to be executed in each of the wireless terminal apparatus 2. Incidentally, the processing shown in FIG. 6 is executed in cooperation with the control section 20 in the wireless terminal apparatus 2 and each section thereof, and is executed while electric power is supplied to the wireless terminal apparatus 2.

After the communication with the relaying apparatus 1a has been established, the wireless terminal apparatus 2 is performing an intermittent operation in accordance with a beacon, signal transmitted from the relaying apparatus 1a at a regular interval. While the wireless terminal apparatus 2 turns off its own power source to perform the operation consuming the electric power thereof as little as possible in the state of having no necessity of communication, the wireless terminal apparatus 2 wakes up in order to receive a beacon signal, and when the beacon signal has a data transmitting and receiving request to the wireless terminal apparatus 2 itself therein, then the wireless terminal apparatus 2 performs the operation in accordance with the request.

The control section 20 judges whether the starting timer 23 has input a starting timing signal or not (Step S11). If no starting timing signals have been input (Step S11: NO), then the control section 20 returns the processing to that at Step S11.

If a starting timing signal has been input Step S11: YES), then the control section 20 judges whether a beacon signal could be received from the relaying apparatus 1a in the wireless channel presently set in the terminal communication section 26 or not (Step S12).

If no beacon signals can be received (Step S12: NO), then the control section 20 stores "0," indicating the fact that no beacon signals could be received (NG), into the register equipped in the storage section 21 (Step S13), and the control section 20 advances the processing to that at Step S17. A shift register, capable of storing judgment results from the latest one at Step S12 to the ones at a plurality of past times, or the like can be used as the register.

If a beacon signal could be received (Step S12: YES), the control section 20 obtains the switching destination information stored in the beacon payload B24 of the received beacon signal, and makes the storage section 21 store the obtained switching destination information (Step S14). Moreover, the control section 20 makes the terminal communication section 26 transmit an ACK signal to the relaying apparatus 1a (Step S15).

Then, the control section 20 stores "1," indicating the fact that the beacon signal could be received (OK), in the register equipped in the storage section 2 (Step S16), and advances the processing to that at Step S17.

After the processing at Step S13 or Step S16, the control section 20 judges whether to switch the wireless channel used by the terminal communication section 26 or not on the basis of the communication situation of the wireless channel used in the terminal communication section 26 (Step S17). At Step S17, the control section 20 refers to the register equipped in the storage section 21 to judge the communication situation of the wireless channel used by the terminal communication section 26.

If the control section 20 does not switch the wireless channel (Step S17: NO), the control section 20 returns the processing to that at Step S11.

As the case of NO at Step S17, for example, if the control section 20 refers to the register equipped in the storage section 21 and finds that the probability that the beacon signals could been received is equal to or more than a probability set beforehand, then the control section 20 judges that the communication situation of the wireless channel used by the terminal communication section 26 has not deteriorated, and does not judges that the wireless channel must be changed.

If the control section 20 switches the wireless channel (Step S17: YES), then the control section 20 switches the wireless channel used by the terminal communication section 26 to another wireless channel (switching destination channel) based on the switching destination information stored in the storage section 21 at Step S14 (Step S18), and returns the processing to that at Step S11.

As the case of YES at Step S17, for example, if the control section 20 refers to the register equipped in the storage section 21 and find that the probability that the beacon signals could be received is lower than a probability set beforehand, then the control section 20 judges that the communication situation of the wireless channel used by the terminal communication section 26 has deteriorated, and judges that the wireless channel must be switched.

As described above, the wireless terminal apparatus 2 can judge the communication situation of the wireless channel used by the terminal communication section 26 on the basis of the reception probability of the beacon signals transmitted from the relaying apparatus 1a by referring to the register.

Incidentally, if a received beacon signal indicates the existence of the data addressed to the wireless terminal apparatus 2 itself, the wireless terminal apparatus 2 executes data receiving processing.

In this data receiving processing, the terminal communication section 26 transmits a data request signal to the relaying apparatus 1a. Then, the terminal communication section 26 receives the ACK signal and data signal transmitted, from the relaying apparatus 1a, and the terminal communication section 26 transmits an ACK signal to the relaying apparatus 1a.

As described above, according to the present first embodiment, when the relaying apparatus 1a transmits a beacon signal, the relaying apparatus 1a stores the switching destination information for performing the switching of a wireless channel to anyone of a plurality of wireless channels in the beacon signal. If the communication situation of the relaying apparatus 1a has deteriorated, the relaying apparatus 1a switches the wireless channel of the first communication section 14 to another wireless channel based on the switching destination information. When the communication situation of the wireless channel used by one of the wireless terminal apparatus 2 has deteriorated, the wireless terminal apparatus 2 can switch the wireless channel to another wireless channel based on the switching destination information stored in a received beacon signal to perform wireless communication.

Accordingly, even if the communication situation of the wireless terminal apparatus 2 has abruptly deteriorated so that the wireless terminal apparatus 2 cannot receive the beacon signals from the relaying apparatus 1a, the wireless terminal apparatus 2 can switch the wireless channel thereof to another wireless channel based on the switching destination information included in the beacon signal that is stored in the terminal storage section 21 and has been received before the communication situation deteriorated, and the wireless terminal apparatus can perform wireless communication with the relaying apparatus 1a.

Consequently, the switching of a wireless channel can rapidly and stably be realized to an abrupt change of the communication situation thereof, and the stabilization of communication quality can be achieved.

Furthermore, because the relaying apparatus 1a stores the switching destination information for switching a wireless channel to another wireless channel being in the best communication situation or another wireless channel being in the relatively better communication situation into a beacon signal at the time of transmitting the beacon signal, each of the relaying apparatus 1a and the wireless terminal apparatus 2 can switch the wireless channel thereof to another wireless channel being in the best communication situation or another wireless channel being in a relatively better communication situation to perform wireless communication when the communication situation of the wireless communication has deteriorated.

Second Embodiment

First, the configuration of a second embodiment is described.

Because the schematic configuration of a wireless communication system in the present second embodiment is similar to that of the wireless communication system A in the first embodiment shown in FIG. 1 except that the relaying apparatus 1a is replaced by a relaying apparatus 1b, the illustration and the description of the schematic configuration are omitted.

Figure 7:
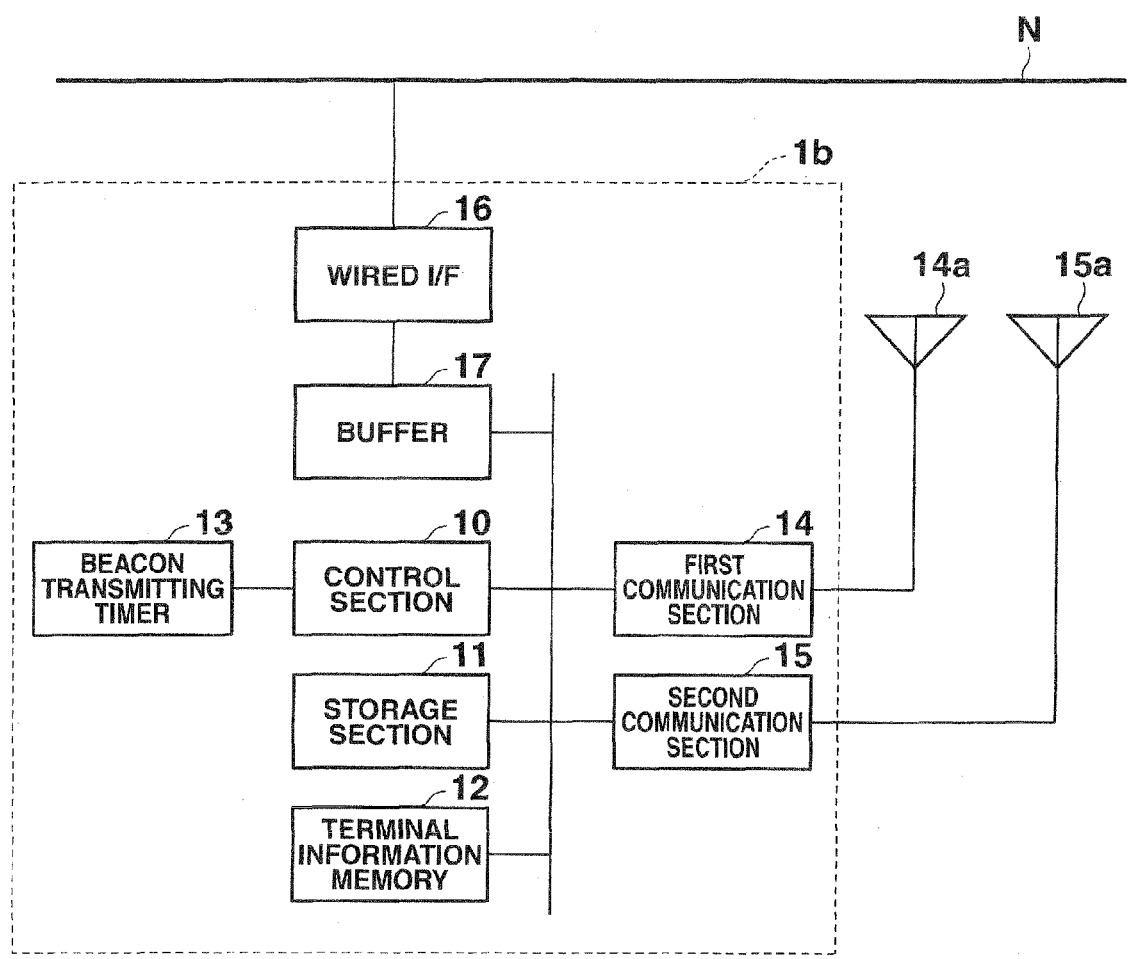
FIG. 7 shows a schematic configuration diagram of a relaying apparatus in the second embodiment.

FIG. 7 shows the schematic configuration diagram of the relaying apparatus 1b in the present second embodiment.

As shown in FIG. 7, because the relaying apparatus 1b is configured to further include a second communication section 15 similarly configured to the first communication section 14 in addition to the configuration of the relaying apparatus 1a of the first embodiment, and the other components are similar to those of the relaying apparatus 1a of the first embodiment, only the different part is described.

Incidentally, the first communication section 14 and the second communication section 15 are generically referred to as a communication section.

In the beacon transmitting processing executed by the control section 10 in the present second embodiment, either of the first communication section 14 and the second communication section 15 is used. Then, in either of them, any one of a plurality of wireless channels is used, and a beacon signal storing switching destination information is transmitted at a predetermined constant period (first period) at the time of transmitting the beacon signal to perform wireless communication with the plurality of wireless terminal apparatuses 2.

When the beacon signal is transmitted at the constant period (first period), similarly to the first embodiment, the communication situations of a plurality of wireless channels are detected by one of the communication sections 14 and 15 which one is performing the wireless communication. Then, the wireless channel being in the best communication situation or the wireless channel being in a relatively better communication situation is selected among the detected plurality of communication situations of the wireless channels. The switching destination information for switching a wireless channel to the selected one (switching destination channel) is stored in the storage section 11 and also in a beacon signal. Then, the beacon signal is transmitted from the one communication section performing the wireless communication.

If the communication situation of the wireless channel used by the one communication section performing the wireless communication has deteriorated, a beacon signal storing the switching destination information stored in the storage section 11 is transmitted from the one communication station at a period (second period) shorter than the one (first period), at which the beacon signal has been transmitted before the deterioration of the communication situation of the wireless channel. Moreover, the wireless channel based on the switching destination information stored in the storage section 11 is used, and the beacon signal storing new switching destination information is transmitted from the other communication section at the first period when the beacon signal is transmitted.

When the wireless communication of all of the plurality of wireless terminal apparatuses 2 performing the wireless communication with the one communication section has been switched to the wireless communication with the other communication section, the transmission of the beacon signal storing the switching destination information at the second period, which transmission has been executed by the one communication section, is stopped, and the transmission processing of the beacon signal by the one communication section is stopped.

Because the beacon signal in the present second embodiment is similar to that of the first embodiment, the illustration and description of the beacon frame thereof are omitted.

Because the configuration of the second communication section 15 is similar to that of the first communication section 14 of the first embodiment, the description thereof is omitted.

Because the schematic configuration of each of the wireless terminal apparatus 2 in the present second embodiment is similar to that of the first embodiment, the illustration thereof is omitted, and only different parts are described.

In the wireless channel switching processing executed by the control section 20 in the present second embodiment, the switching destination information stored in a beacon signal is stored in the storage section 21 when the beacon signal is received by the terminal communication section 26.

Moreover, if the communication situation of the wireless channel used by the terminal communication section 26 has deteriorated, the terminal communication section 26 is kept in a receivable state of a beacon signal for a previously set time (reception keeping time). If no beacon signals are received for the reception keeping time, the wireless channel used by the terminal communication section 26 is switched to another wireless channel based on the switching destination information stored in the storage section 21, and the reception of a beacon signal is performed.

Next, the operation of the present second embodiment is described.

Figure 8:
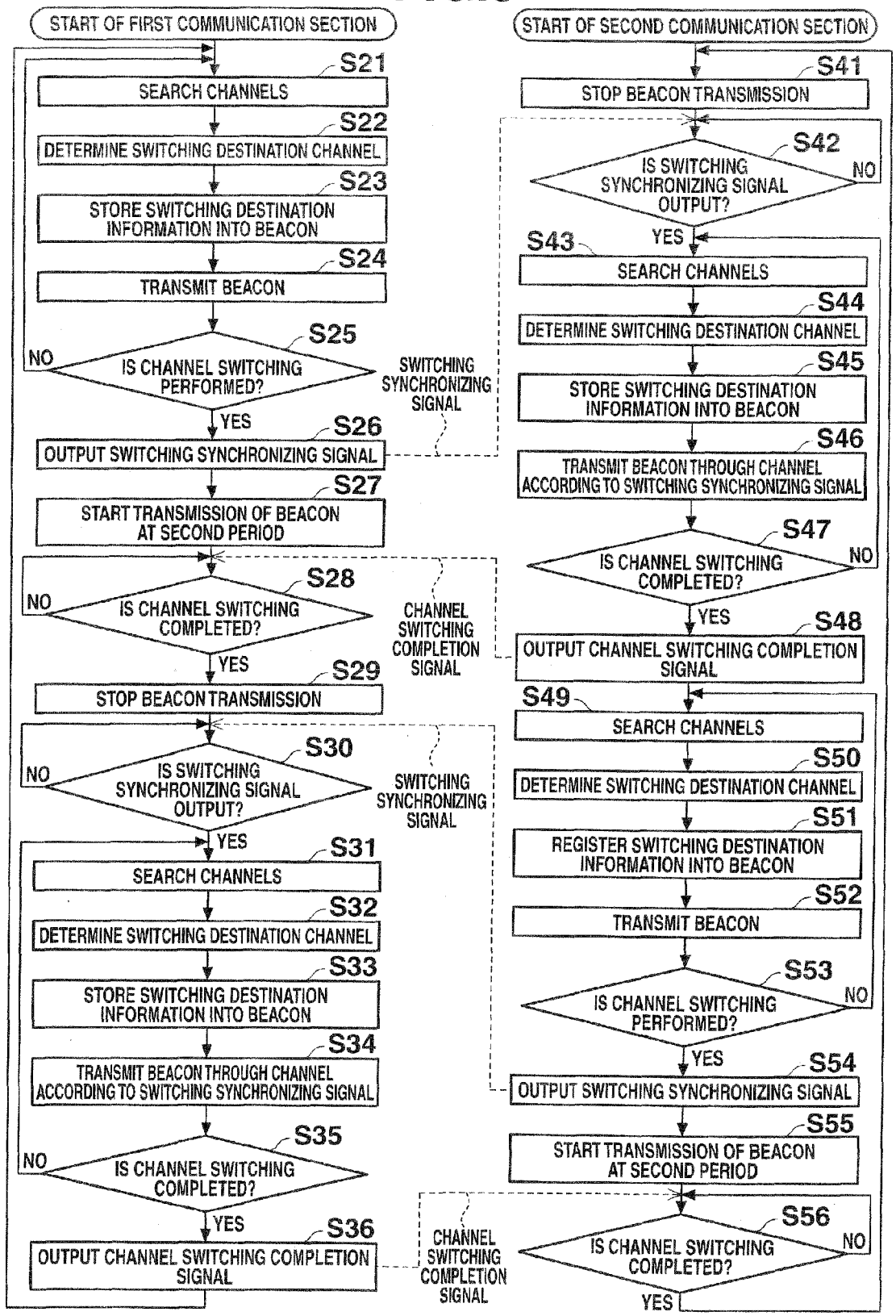
FIG. 8 shows a flow chart of beacon transmitting processing in the second embodiment.

FIG. 8 shows the flow chart of beacon transmitting processing executed to the first communication section 14 and the second communication section 15 in the relaying apparatus 1b. Incidentally, the processing shown in FIG. 8 is executed in cooperation with the control section 10 and each section of the relaying apparatus 1b, and is executed while electric power is supplied to the relaying apparatus 1b.

First, the beacon transmitting processing to be executed to the first communication section 14 is described.

The processing at Steps S21-S25 is similar to that at Steps S1-S5 to be executed when a beacon transmission timing signal is input at a first period by the beacon transmitting timer 13, the description of the processing is omitted. The second communication section 15 is in a stopped state while the first communication section 14 is executing the processing at Steps S21-S25.

If the control section 10 judges the switching of the wireless channel of the first communication section 14 (Step S25: YES), then the control section 10 outputs a switching synchronizing signal (Step S26)

The switching synchronizing signal is a signal for synchronizing the operations of the first communication section 14 and the second communication section 15. The switching synchronizing signal instructs a transmission starting of a beacon signal at the second period shorter than the first period to the communication section transmitting the beacon signal at the first period, and instructs a transmission starting of a beacon signal at the first period by the use of the wireless channel based on the switching destination information stored in the storage section 11 to the communication section in a stopping state.

The control section 10 makes the first communication section 14, which has been transmitting a beacon signal at the first period, start transmission of a beacon signal storing switching destination information stored in the storage section 11 at the second period in accordance with a switching synchronizing signal (Step S27).

The control section 10 judges whether channel switching is completed or not (Step S28).

At the judgment at Step S28, the control section 10 judges whether the control section 10 has output a channel switching completion signal from the output of the switching synchronizing signal (Step S26) to the present time or not.

The channel switching completion signal is a signal output when the communication section (the second communication section 15 here) transmitting a beacon signal at the first period has received ACK signals from all of the wireless terminal apparatus 2 in a period from outputting a switching synchronizing signal to the present time.

That is, the channel switching completion signal is a signal indicating that the wireless communication of all of a plurality of wireless terminal apparatuses 2 performing wireless communication with the communication section (the first communication section 14 here) transmitting a beacon signal at the second period has changed to the wireless communication with the other communication section (the second communication section 15 here).

If the channel switching is not completed (Step S28: NO), then the control section 10 returns the processing to that at Step S28.

If the channel switching has been completed (Step S28: YES), then the control section 10 makes the first communication section 14 stop the transmission of the beacon signal at the second period, and makes the first communication section 14 stop the transmission processing of the beacon signal (Step S29).

The control section 10 judges whether the control section 10 has output a switching synchronizing signal or not (Step S30) after the processing at Step S29. If the control section 10 has not output any switching synchronizing signals (Step S30: NO), then the control section 10 returns the processing to that at Step S30.

If the control section 10 has output a switching synchronizing signal (Step S30: YES), then the control section 10 makes the first communication section 14 execute a channel search to detect the communication situations of all of the wireless channels when a beacon transmission timing signal is input into the control section 10 at the first period by the beacon transmitting timer 13 (Step S31). Because the channel search executed at Step S31 is similarly to the processing at Step S1 of FIG. 5, the description thereof is omitted.

The processing at Steps S32 and S33 are similar to that at Steps S2 and S3 of FIG. 5, respectively, the description thereof is omitted.

The control section 10 sets the wireless channel based on the switching destination information stored in the storage section 11 in the first communication section 14 according to a switching synchronizing signal, and the control section 10 makes the first communication section 14 transmit a beacon signal through the wireless channel (Step S34).

The control section 10 judges whether the channel switching is completed or not (Step S35).

At the judgment at Step S35, the control section 10 judges the channel switching completion when the communication section (the first communication section 14 here) transmitting a beacon signal at the first period in a period from outputting a switching synchronizing signal (Step S30: YES) to the present time has received ACK signals from all of the wireless terminal apparatus 2.

If the channel switching is not completed (Step S35: NO), then the control section 10 returns the processing to that at Step S31.

If the channel switching is completed (Step S35: YES), then the control section 10 outputs a channel switching completion signal (Step S36), and returns the processing to that at Step S21.

Next, the beacon transmitting processing executed to the second communication section 15 shown in FIG. 8 is described.

Because the processing content of the beacon transmitting processing executed to the second communication section 15 is the same as that of the beacon processing executed to the first communication section 14, the correspondence relations between them will be described, and the detailed description of the processing is omitted.

The processing at Step S41 executed to the second communication section 15 is similar to that at Step S29 executed to the first communication section 14.

The processing at Steps S42-S48 executed to the second communication section 15 is similar to that at Steps S30-S36 executed to the first communication section 14.

The processing at Steps S49-S54 executed to the second communication section 15 is similar to that at Steps S21-S26 executed to the first communication section 14.

The processing at Steps S55 and S56 executed to the second communication section 15 is similar to that at Steps S27 and S28 executed to the first communication section 14.

Figure 9:
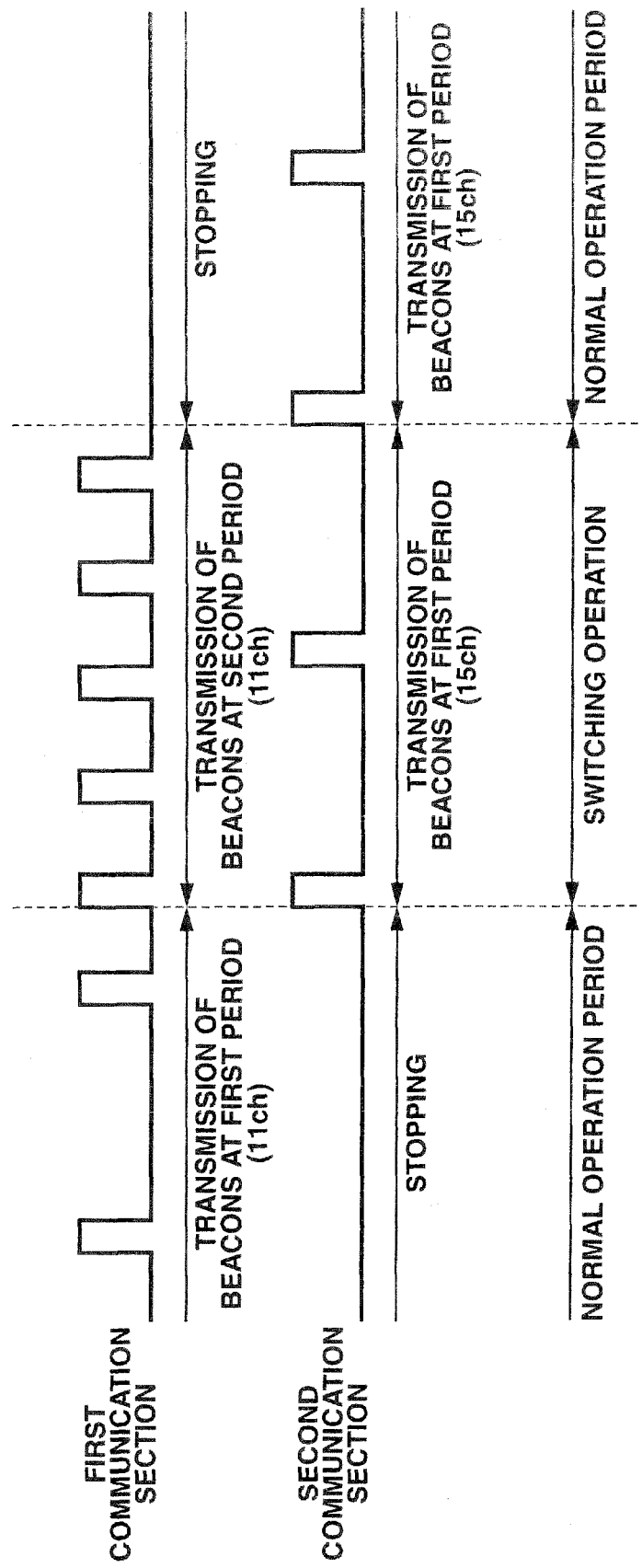
FIG. 9 shows a time chart of beacon transmitting processing of a first communication section and a second communication section.

FIG. 9 shows a time chart of beacon transmitting processing of the first communication section 14 and the second communication section 15.

As shown in FIGS. 8 and 9, the second communication section 15 is in the stopping state (Step S41) thereof in a period (Steps S21-S25) in which the first communication section 14 is transmitting a beacon signal storing switching destination information at the first period by the use of a predetermined wireless channel (for example, 11 ch). In the following, a period in which one communication section is transmitting a beacon signal including switching destination information at the first period and the other communication section is in the stopping state thereof is referred to as a normal operation period.

Moreover, as shown in FIGS. 8 and 9, in a period (Steps S26-S28) in which the communication situation of the wireless channel (for example, 11 ch.) used by the first communication section 14 has deteriorated and the first communication section 14 is transmitting a beacon signal including switching destination information at the second period shorter than the first period, the second communication section 15 is transmitting a beacon signal at the first period by the use of a switching destination channel (for example, 15 ch.) base on switching destination information (Steps S42-S47). In the following, the period in which one communication section is transmitting a beacon signal including switching destination information at the second period and the other communication section is transmitting a beacon signal at the first period by the use of a switching destination channel is referred to as a switching operation period.

Then, when the wireless communication of all of the wireless terminal apparatus 2 performing wireless communication with the first communication section 14 has been switched to the wires communication with the second communication section 15 (Step S48), the first communication section 14 becomes the stopping state thereof (Step S29), and the second communication section 15 transmits a beacon signal including switching destination information at the first period by successively using the wireless channel (switching destination channel (for example, 15 ch.)), which the second communication section 15 has used in the switching operation period. Then, the second communication section 15 performs wireless communication with a plurality of wireless terminal apparatuses 2 (Step S49-S53), and the operation period becomes the normal operation period.

After that, if the communication situation of the wireless channel (for example, 15 ch.) used by the second communication section 15 has deteriorated, then the operation period becomes the switching operation period, in which the second communication section 15 transmits a beacon signal including switching destination information at the second period shorter than the first period and the first communication section 14, which has been in the stopping state thereof, transmits a beacon signal at the first period by the use of the switching destination channel based on switching destination information.

Incidentally, if a data request signal is transmitted from one of the wireless terminal apparatus 2 to a beacon signal transmitted by the relaying apparatus 1b, then the relaying apparatus 1b executes data transmitting processing. Because the data transmitting processing executed by the relaying apparatus 1b is similar to another wireless channel executed by the relaying apparatus 1a of the first embodiment, the description thereof is omitted.

Figure 10:
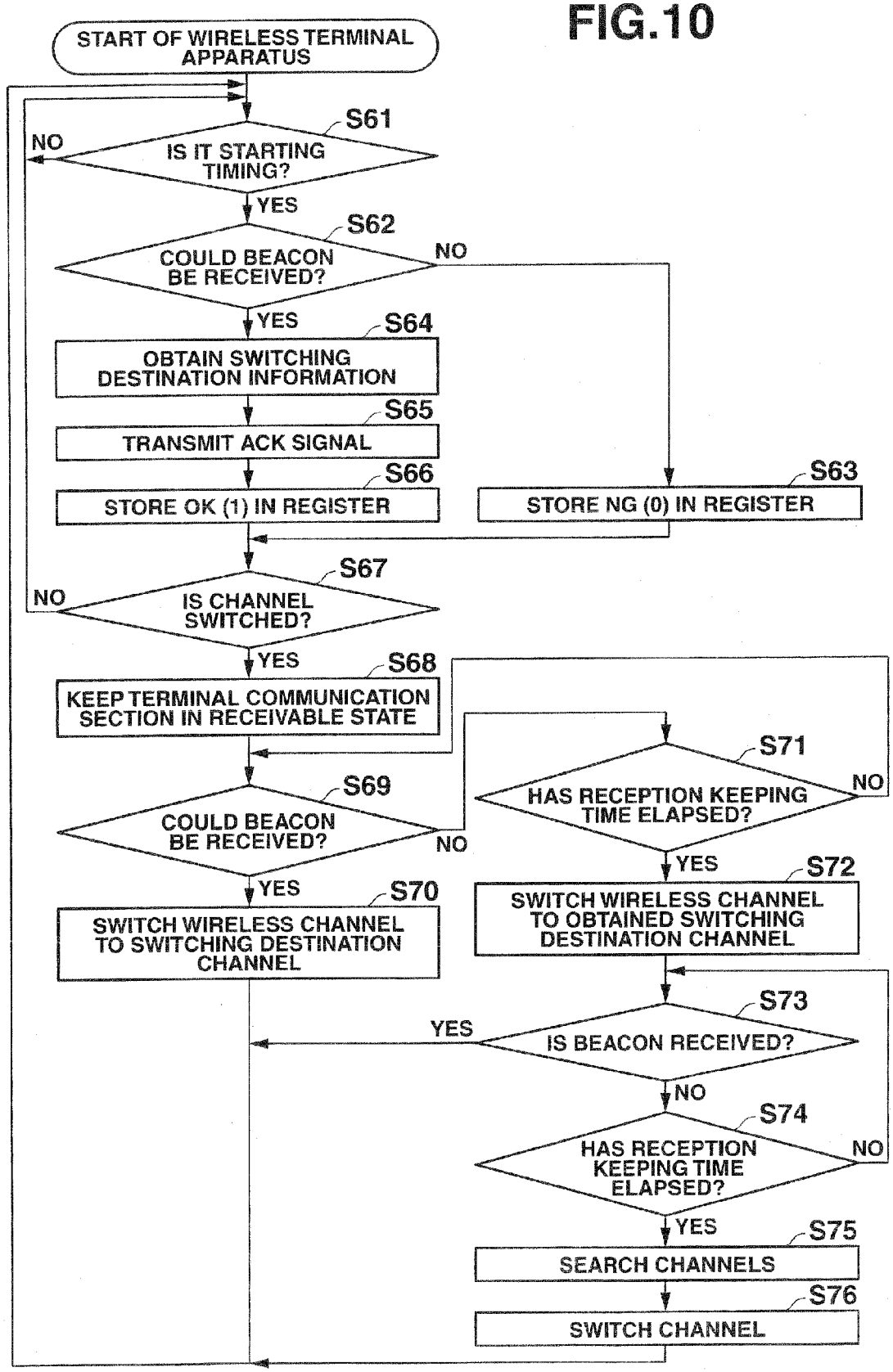
FIG. 10 shows a flow chart of the wireless channel switching processing executed in the second embodiment.

FIG. 10 shows a flow chart of the wireless channel switching processing executed in each of the wireless terminal apparatus 2. Incidentally, the processing shown in FIG. 10 is executed in cooperation with the control section 20 in the wireless terminal apparatus 2 and each section thereof, and is executed while electric power is supplied to the wireless terminal apparatus 2.

Because the processing at Steps S61-67 is similar to that at Steps S11-S17 shown in FIG. 6, the description thereof is omitted.

If the control section 20 switches the wireless channel (Step S67: YES), then the control section 20 makes the terminal communication section 26 keep to be in the receivable state of a beacon signal (Step S18), and starts timing by an internal timer. Then, the control section 20 judges whether the terminal communication section 26 has received a beacon signal or not (Step S69).

It the terminal communication section 26 has received a beacon signal (Step S69: YES), then the control section 20 obtains the switching destination information stored in the beacon payload B24 of the received beacon signal, and makes the storage section 21 store the obtained switching destination information. Furthermore, the control section 20 switches the wireless channel used by the terminal communication section 26 to another wireless channel (switching destination channel) based on the switching destination information (Step 70), and returns the processing to that at Step S61.

If the terminal communication section 26 has not received any beacon signals (Step S69: NO), then the control section 20 starts to keep the terminal communication section 26 in the receivable state of a beacon signal, and then judges whether the timed time of the timing internal timer has elapsed the reception keeping time or not (Step S71).

If the reception keeping time has not elapsed (Step S71: NO), then the control section 20 returns the processing to that at Step S69.

If the reception keeping time has elapsed (Step S71: YES), the control section 20 switches the wireless channel, used by the terminal communication section to another wireless channel (switching destination channel) based on the switching destination information, which has obtained from the beacon signal received immediately before the execution of the processing at Step 68 and has been stored in the storage section 21, on the basis of the switching destination information (Step S72).

After the processing at Step S72, the control section 20 makes the terminal communication section 26 be in the receivable sate of a beacon signal, and starts the timing by the internal timer. Then, the control section 20 judges whether the terminal communication section 26 has received a beacon signal by using the switching destination channel or not (Step S73).

If the terminal communication section 26 has received a beacon signal (Step S73: YES), then the control section 20 obtains the switching destination information stored in the beacon payload B24 of the received beacon signal, and makes the storage section 21 store the obtained switching destination information. Then, the control section 20 returns the processing to that at Step S61.

If the terminal communication section 26 has not received any beacon signals (Step S73: NO), the control section 20 starts the keeping of the terminal communication section 26 to be in the receivable state of a beacon signal after the processing at Step S72, and then judges whether the timed time of the timing internal timer has elapsed the reception keeping time or not (Step S74).

If the reception keeping time has not elapsed (Step S74: NO), then the control section 20 returns the processing to that at Step S73.

If the reception keeping time has elapsed (Step S74: YES), then the control section 20 executes a channel search with the terminal communication section 26, and makes the terminal communication section 26 detect the communication situations of all of the wireless channels (Step S75). Because the channel search at Step S75 is similar to that at Step S1, the description thereof is omitted.

The control section 20 selects the wireless channel in the best communication situation (for example, the wireless channel having the smallest electric field strength among the electric field strengths of the respective wireless channels obtained by the processing at Step S75) on the basis of the communication situations of the respective wireless channels obtained by the processing at Step S75. Incidentally, the control section 20 may select the wireless channel in a relatively better communication situation.

Then, the control section 20 switches the wireless channel used by the terminal communication section 26 to the selected wireless channel (Step S76), and returns the processing to that at Step S61.

Incidentally, if a received beacon signal shows the existence of the data addressed to the wireless terminal apparatus 2 itself, the wireless terminal apparatus 2 executes data receiving processing. Because the data receiving processing executed by the wireless terminal apparatus 2 is similar to the data receiving processing executed by the wireless terminal apparatus 2 of the first embodiment, the description thereof is omitted.

As described above, according to the present second embodiment, it is of course that the similar effects to those of the first embodiment can be obtained. In addition, the relaying apparatus 1b performs wireless communication with the wireless terminal apparatus 2 by means of one communication section between the two communication sections (first communication section 14 and second communication section 15). If the communication situation of the wireless channel used by the one communication section has deteriorated, then the relaying apparatus 1b makes the one communication section transmit a beacon signal including switching destination information at a short period, and can makes the other communication section transmit a beacon signal through the wireless channel based on the switching destination information.

Consequently, if the communication situation of the wireless channel has deteriorated, then each of the wireless terminal apparatus 2 can improve the probability of receiving a beacon signal storing switching destination information indicating the wireless channel used by the other communication section of the relaying apparatus 1b.

Consequently, the speeding-up of the switching of the wireless channel of each of the wireless terminal apparatus 2 can be achieved.

Furthermore, if the wireless communication of all of the wireless terminal apparatus 2 performing the wireless communication has changed from the wireless communication with one communication section to that with the other communication section, then the transmission of a beacon signal from the one communication section can be stopped. Consequently, the useless use of the wireless channel not performing wireless communication can be prevented, and the generation of the useless consumption of electric power can be prevented.

Moreover, if the communication situation of the wireless channel used by the terminal communication section 26 of each of the wireless terminal apparatus 2 has deteriorated, the wireless terminal apparatus 2 can receive a beacon signal by switching the wireless channel used by the terminal communication section 26 on the basis of the switching destination information stored in the storage section 21 when no beacon signals are received for a previously set time.

Consequently, even if the wireless terminal apparatus 2 cannot receive the latest beacon signal, the wireless terminal apparatus 2 can receive a beacon signal by switching the wireless channel to another wireless channel based on the switching destination information stored in the wireless terminal storage section 21. Consequently, the necessity of the time for scanning all of the wireless channels is removed, and the rapid switching of wireless channels can be realized.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. A wireless communication system comprising:
a plurality of wireless terminal apparatuses; and
a relaying apparatus to perform wireless communication with the plurality of wireless terminal apparatuses,
wherein the relaying apparatus includes:
a first storage section to store switching destination information of a first wireless channel being any one of a plurality of wireless channels;
two first communication sections to perform the wireless communication by transmitting a beacon signal to the plurality of wireless terminal apparatuses by using a second wireless channel being any one of the plurality of wireless channels; and
a first control section to: (i) store, in the beacon signal and in the first storage section, the switching destination information to be used to switch the second wireless channel to the first wireless channel when one of the first communication sections transmits the beacon signal, and transmit the beacon signal storing the switching destination information by said one of the first communication sections by using the second wireless channel, and (ii) switch from the second wireless channel used by said one of the first communication sections to the first wireless channel based on the switching destination information stored in the first storage section when a communication situation of the second wireless channel used by said one of the first communication sections has deteriorated,
wherein when the communication situation of the second wireless channel used by said one of the first communication sections has deteriorated, the first control section makes said one of the first communication sections transmit, by using the second wireless channel, the beacon signal storing the switching destination information stored in the first storage section at a second period shorter than a first period used before the communication situation of the second wireless channel has deteriorated, and the first control section further makes the other of the first communication sections transmit, by using the first wireless channel, the beacon signal storing a switching destination information at the first period while keeping said one of the first communication sections performing the wireless communication; and wherein each of plurality of the wireless terminal apparatuses includes:
- a second storage section to store the switching destination information of the first wireless channel;
- a second communication section to perform the wireless communication by receiving the beacon signal transmitted from the relaying apparatus by using the second wireless channel being any one of the plurality of wireless channels; and
- a second control section to: (i) store the switching destination information stored in the beacon signal into the second storage section at a time of receiving the beacon signal by the second communication section, and (ii) switch the second wireless channel being used by the second communication section to the first wireless channel based on the switching destination information stored in the second storage section when a communication situation of the second wireless channel used by the second communication section has deteriorated.

2. The wireless communication system according to claim 1, wherein the first control section detects communication situations of the plurality of wireless channels by at least one of the two first communication sections at a time of making the at least one of the two first communication sections transmit the beacon signal, and the first control section selects a wireless channel being in a good communication situation among the detected communication situations of the plurality of wireless channels to set the selected wireless channel as the first wireless channel.

3. The wireless communication system according to claim 1, wherein when the wireless communication of all of the plurality of wireless terminal apparatuses that have been performing the wireless communication with said one of the first communication sections has changed to the wireless communication with the other of the first communication sections, the first control section stops the transmission of the beacon signal storing the switching destination information stored in the first storage section at the second period by said one of the first communication sections.

4. The wireless communication system according to claim 1, wherein when a probability that the second communication section receives the beacon signal transmitted from the relaying apparatus is lower than a probability set beforehand, the second control section judges that the communication situation of the second wireless channel used by the second communication section has deteriorated.

5. The wireless communication system according to claim 1, wherein when the communication situation of the second wireless channel used by the second communication section has deteriorated, the second control section keeps the second communication section in a receivable state of the beacon signal for a previously set time, and
when the beacon signal is not received for the previously set time, the second control section switches the second wireless channel used by the second communication section to the first wireless channel based on the switching destination information stored in the second storage section to receive the beacon signal.

6. A wireless communication method between a plurality of wireless terminal apparatuses and a relaying apparatus, the relaying apparatus including two first communication sections to perform wireless communication by transmitting a beacon signal to the plurality of wireless terminal apparatuses by using a first wireless channel being any one of a plurality of wireless channels, wherein each of the wireless terminal apparatuses includes a second communication section to perform the wireless communication by receiving the beacon signal, transmitted from the relaying apparatus, by using the first wireless channel being any one of the plurality of wireless channels, the method comprising:

storing switching destination information to be used to switch the first wireless channel to a second wireless channel being another one of the plurality of wireless channels, in the beacon signal together with in a first storage section, equipped in the relaying apparatus, when one of the first communication sections transmits the beacon signal by using the first wireless channel;

transmitting the beacon signal storing the switching destination information by said one of the first communication sections;

switching from the first wireless channel used by said one of the first communication sections to the second wireless channel based on the switching destination information stored in the first storage section when a communication situation of the first wireless channel used by said one of the first communication sections has deteriorated, wherein the switching comprises, when the communication situation of the first wireless channel has deteriorated, making said one of the first communication sections transmit, by using the first wireless channel, the beacon signal storing the switching destination information stored in the first storage section at a second period shorter than a first period used before the communication situation of the first wireless channel has deteriorated, and making the other of the first communication sections transmit, by using the second wireless channel, the beacon signal storing a switching destination information at the first period while keeping said one of the first communication sections performing the wireless communication;

storing the switching destination information stored in the beacon signal into a second storage section equipped in each of the plurality of wireless terminal apparatuses when the second communication section receives the beacon signal; and switching from the first wireless channel used by the second communication section to the second wireless channel based on the switching destination information stored in the second storage section when the communication situation of the first wireless channel used by the second communication section has deteriorated.

7. The wireless communication method according to claim 6, further comprising:
detecting communication situations of the plurality of wireless channels by at least one of the two first communication sections at a time of transmitting the beacon signal by the at least one of the two first communication sections;
selecting one wireless channel being in a good communication situation among the detected communication situations of the plurality of wireless channels; and
using the selected wireless channel as the second wireless channel.

8. A wireless communication apparatus that includes a plurality of communication sections and selects any one of the plurality of communication sections to perform wireless communication between the selected communication section and an external wireless terminal, the apparatus comprising:

a first control section to: (i) select a first communication section among the plurality of communication sections, and (ii) perform the wireless communication with the external wireless terminal by the selected first communication section;

a second control section to detect whether or not a communication situation of the wireless communication by the selected first communication section has deteriorated, and to make a second communication section among the plurality of communication sections perform the wireless communication with the external wireless terminal while keeping the first communication section performing the wireless communication, when the second control section detects the deterioration of the communication situation;

a judging section to judge whether or not the wireless communication by the second communication section has been established after the second communication section has started the wireless communication; and a third control section to switch from the wireless communication by the first communication section to the wireless communication by the second communication section when the judging section judges that the wireless communication by the second communication section has been established;

wherein the first control section performs the wireless communication at every first period when the first communication section is performing the wireless communication, and wherein the second control section makes the first communication section perform the wireless communication with the external wireless terminal at every second period shorter than the first period when the second communication section is performing the wireless communication while the first communication section keeps performing the wireless communication.

9. The wireless communication apparatus of claim 8, wherein the second control section detects whether or not the communication situation of the wireless communication by the first communication section has deteriorated based on whether a response signal from the external wireless terminal has been received or not.

10. The wireless communication apparatus of claim 8, wherein the second control section makes the second communication section perform the wireless communication with the external wireless terminal at every first period when the second control section makes the second communication section perform the wireless communication while keeping the first communication section performing the wireless communication.

11. The wireless communication apparatus of claim 8, wherein the second control section makes the second communication section search communication situations of a plurality of wireless channels and selects one of the plurality of wireless channels being in a best communication situation, and the judging section judges whether or not a wireless communication between said one of the plurality of wireless channels being in the best communication situation and the second communication section has been established.

12. The wireless communication apparatus of claim 8, wherein the third control section switches from the first communication section performing the wireless communication to the second communication section by stopping the wireless communication by the first communication section when the judging section judges that the wireless communication by the second communication section has been established.

13. A non-transitory computer-readable storage medium having stored thereon a program for a computer included in a wireless communication apparatus which comprises a plurality of communication sections to perform wireless communication and which selects any one of the plurality of communication sections to perform the wireless communication between the selected communication section and an external wireless terminal, the program causing the computer to function as:

a first control section to: (i) select a first communication section among the plurality of the communication sections, and (ii) perform the wireless communication with the external wireless terminal by the selected first communication section;

a second control section to detect whether or not a communication situation of the wireless communication by the selected first communication section has deteriorated, and to make a second communication section among the plurality of communication sections perform the wireless communication with the external wireless terminal while keeping the first communication section performing the wireless communication, when the second control section detects the deterioration of the communication situation;

a judging section to judge whether or not the wireless communication by the second communication section has been established after the second communication section has started the wireless communication; and a third control section to switch from the wireless communication by the first communication section to the wireless communication by the second communication section when the judging section judges that the wireless communication by the second communication section has been established;

wherein the first control section performs the wireless communication at every first period when the first communication section is performing the wireless communication, and wherein the second control section makes the first communication section perform the wireless communication with the external wireless terminal at every second period shorter than the first period when the second communication section is performing the wireless communication while the first communication section keeps performing the wireless communication.

\* \* \* \* \*